United States Patent
Mace

(10) Patent No.: US 6,705,122 B2
(45) Date of Patent: Mar. 16, 2004

(54) METHOD AND APPARATUS FOR CONTROLLING TEMPERATURE OF COOLING AIR FOR GLASS MANUFACTURING MACHINE

(75) Inventor: Douglas K. Mace, Perrysburg, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 200 days.

(21) Appl. No.: 09/923,638

(22) Filed: Aug. 7, 2001

(65) Prior Publication Data

US 2003/0029200 A1 Feb. 13, 2003

(51) Int. Cl.7 .............................. C03B 9/00; C03B 11/00
(52) U.S. Cl. .............................. 65/356; 65/355; 65/162; 65/137; 65/29.19; 65/29.21; 249/79; 425/143; 425/144; 425/526; 425/547; 425/552
(58) Field of Search .......................... 65/29.19, 29.21, 65/319, 356, 355, 162, 137; 34/428; 249/79; 425/143, 144, 552, 547, 526

(56) References Cited

U.S. PATENT DOCUMENTS

| | | |
|---|---|---|
| 2,570,189 A | 10/1951 | Bäckström |
| 2,569,339 A | 12/1951 | Russell |
| 3,259,175 A * | 7/1966 | Kraus et al. .................. 165/267 |
| 3,333,936 A | 8/1967 | Warren |
| 3,416,908 A | 12/1968 | Goodwin et al. |
| 3,586,491 A | 6/1971 | Mennitt |
| 3,854,921 A | 12/1974 | Jones |
| 4,812,156 A * | 3/1989 | Virey et al. ..................... 65/83 |
| 5,900,035 A | 5/1999 | Hoenig et al. |

* cited by examiner

Primary Examiner—Michael Colaianni

(57) ABSTRACT

The temperature of cooling air to a manifold for distribution to molds of a glass manufacturing machine is controlled by passing untreated air through an indirect heat exchanger in indirect heat exchange relationship with water flowing through a coil in the indirect heat exchanger before treated air from the indirect heat exchanger is passed through a blower for distribution to the manifold. Water for treating the air flowing through the indirect heat exchanger is pumped through the coil from a water cooling tower that is used in a glass manufacturing plant, either at a first temperature from a first outlet of the water cooling tower or at a second temperature from a second outlet of a water cooling tower, or a mixture of water from the first outlet and the second outlet. In a first embodiment, water from the first outlet and water from the second outlet pass through a temperature controlled three-way mixing valve before delivery to a pump for delivery to the indirect heat exchanger. In a second embodiment, water from a first outlet is delivered to a pump and then to a temperature control three-way valve for delivery to the indirect heat exchanger or for return to a location upstream of the pump. In the latter embodiment, air from the blower is also caused to flow through a second indirect heat exchanger before delivery to the manifold, and its temperature is altered in the second indirect heat exchanger in indirect heat exchange relationship with water flowing through a coil in a second indirect heat exchanger. In this embodiment, water flows from the water cooling tower to the coil of the second indirect heat exchanger, and a temperature controlled two-way valve is placed in a line between the water cooling tower and the second indirect heat exchanger to control the rate of water flowing through the second indirect heat exchanger.

9 Claims, 2 Drawing Sheets

METHOD AND APPARATUS FOR CONTROLLING TEMPERATURE OF COOLING AIR FOR GLASS MANUFACTURING MACHINE

FIELD OF THE INVENTION

This invention relates to a method and apparatus for controlling the temperature of cooling air that is used to cool molten glass contacting elements of a glass forming machine. More particularly, this invention relates to a method and apparatus for controlling the temperature of air that is used to cool molds in a glass container forming machine of the individual section (I.S.) type.

BACKGROUND OF THE INVENTION

Commonly assigned U.S. Pat. No. 5,900,035 (Hoening, et al.), the disclosure of which is incorporated by reference herein, describes the cooling of an annular, split mold of a glass manufacturing machine by causing cooling air to flow around the mold, while the mold is closed and an article is being formed therein from glass at a sufficiently high temperature to be moldable. U.S. Pat. No. 3,586,491 (Mennitt), the disclosure of which is also incorporated by reference herein, and which was assigned to a predecessor of the assignee of the present invention, also discloses a glass manufacturing mold air cooling arrangement. Each of the '035 and '491 patents specifically describes the manufacture of hollow glass articles, such as food and beverage packaging containers, by a glass forming machine of the I.S. type, now the most widely used glass container forming machine type.

The cooling effect of an air stream used to cool a glass manufacturing mold, for an air stream of a given flow rate, is a function of the temperature of the air entering the cooling system. Thus, when ambient air is used, unless the temperature of the cooling air is controlled by heating and/or cooling it to maintain a constant temperature, the cooling effect of the air stream will vary, and this can lead to undesired variations in the properties of the glass articles being molded in the air-cooled mold and/or undesired variations in glass manufacturing cycle times to accommodate variations in mold cooling effects as a result of variations in mold cooling air temperatures.

To overcome glass forming mold cooling air temperature variations, it has been known to increase cooling air temperatures by mixing hotter air from a portion of the glass manufacturing plant, for example, from around a glass melting furnace, with a cooling air supply from an outside location. It has also been known to reduce cooling air temperature by injecting a water spray into a cooling air supply to cool the air supply by evaporation of the water spray. Of course, this latter technique is only capable of cooling the air supply until its moisture saturation level is reached, and can result in contamination of the cooling air stream unless the injected water is properly filtered before injection. It is toward a solution of problems associated with prior glass manufacturing mold cooling air temperature control systems that the present invention is directed.

SUMMARY OF THE INVENTION

According to an embodiment of the present invention, mold cooling air for a glass molding machine is heated to maintain it at a desired temperature for introduction into a glass molding machine by an indirect heat exchanger that is positioned upstream of the inlet to the cooling air blower. In this embodiment, the cooling medium is water and the water is obtained from a water cooling tower of a type that is usually present in a glass manufacturing plant. The water can either be obtained from the inlet to the water cooling tower, where it will be approximately 100° F., or from the outlet from the water cooling tower, where it will be approximately 85° F., or, when needed, the water from the water cooling tower inlet is mixed with water from the water cooling tower outlet, in which case a mixing valve is provided to mix water cooling tower inlet water and water cooling tower outlet water in proper proportions to ensure that the water temperature going to the heat exchanger will properly heat the cooling air supply going to the heat exchanger to maintain a substantially constant cooling air outlet temperature. Some cooling of the cooling air is also possible according to this embodiment at the outer limits of cooling air temperature, for example, when room temperature is substantially elevated from outside air temperature.

According to another embodiment of the present invention, when it is desired to be able to either heat or cool cooling air temperature to maintain a substantially constant cooling air temperature, a second indirect heat exchanger is employed and the second indirect heat exchanger is positioned downstream of the outlet from the cooling air blower. According to this embodiment, cold water from the inlet to the cooling water tower is delivered to the second indirect heat exchanger and, if and to the extent needed, the cold water from the outlet of the water cooling tower is throttled to ensure that the cooling effect of the water going to the second heat exchanger is proper for proper cooling of the cooling air stream. With proper automatic temperature control elements, when a pair of indirect heat exchangers are employed according to the second embodiment of the present invention, the temperature of the cooling air going to the molds of a glass manufacturing machine will remain substantially constant, notwithstanding wide variations in the temperature of the air entering the cooling air system, for example, normal day to night air temperature variations or seasonal air temperature variations.

Accordingly, it is an object of the present invention to provide an improved method and apparatus for controlling the temperature of cooling air going to the molds of a glass manufacturing machine. More particularly, it is the object of the present invention to provide a method and apparatus according to the foregoing character that is capable of controlling the temperature of cooling air employed in cooling the molds of a glass manufacturing machine at a substantially constant rate, notwithstanding wide variations of the temperature of the cooling air at the inlet to the cooling air system, for example, due to day to night or seasonal air temperature variations.

For a further understanding of the present invention and the objects thereof, attention is directed to the drawing and the following brief description thereof, to the detailed description of the invention and to the appended claims.

DETAILED DESCRIPTION OF THE INVENTION

Figure 1:
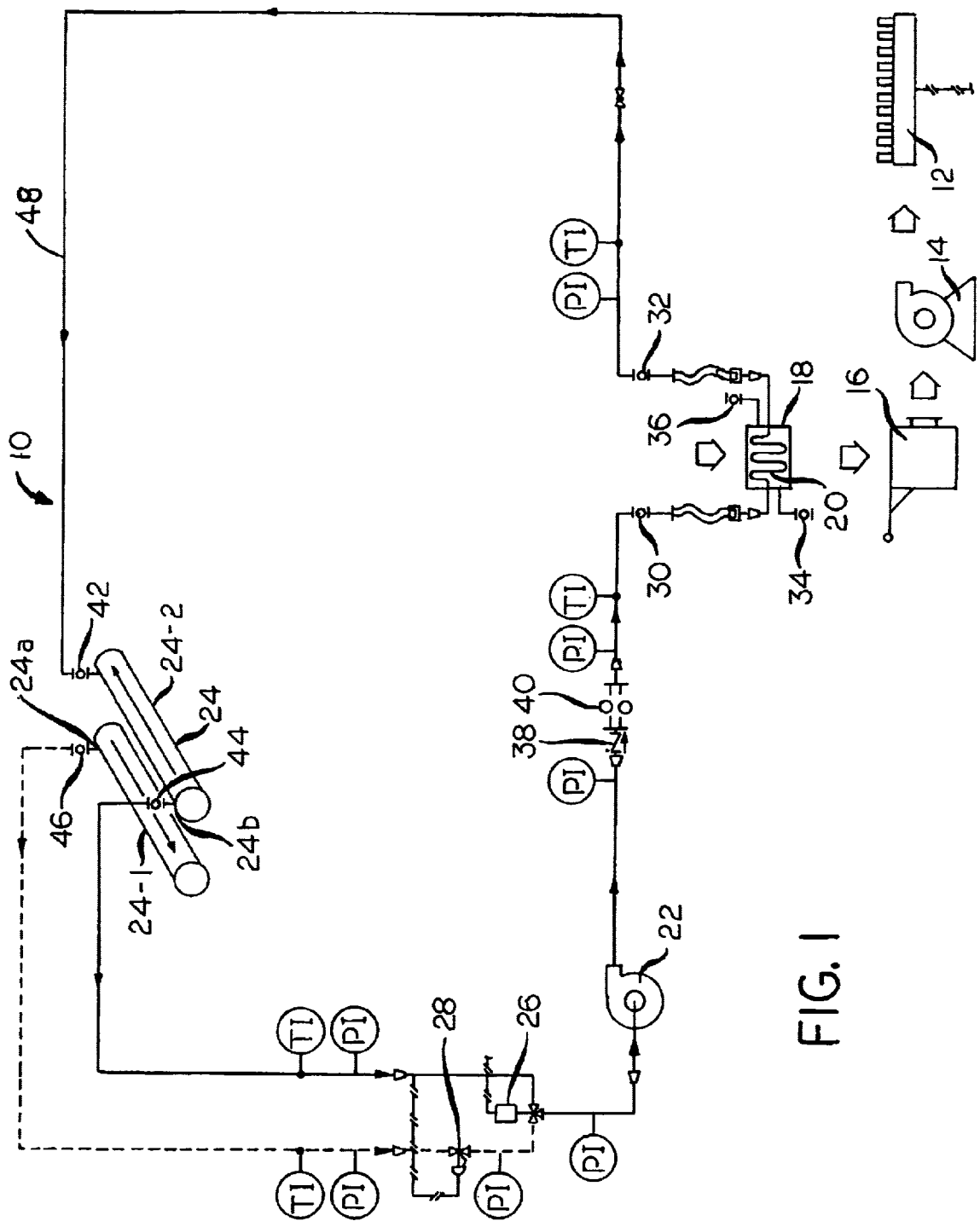
FIG. 1 is a schematic view of a glass molding machine cooling air temperature control system according to an embodiment of the present invention.

A glass manufacturing mold cooling air temperature control system according to the embodiment of FIG. 1 is identified generally by reference numeral 10 therein. In the temperature control system 10, cooling air is delivered to a cooling air manifold 12 of a glass manufacturing machine from a blower 14, which receives properly treated (usually heated) cooling air from an air plenum 16. The air plenum 16 receives treated cooling air from an indirect heat exchanger 18, and untreated or not properly treated air flows into the heat exchanger 18 from outside the glass manufacturing plant or from a location within the plant. The air passing through the heat exchanger 18 is heated (or cooled) by water flowing through the heat exchanger 18, the water being isolated from the air passing through the heat exchanger 18 by passing the water through a sinuous coil 20 that is housed within the heat exchanger 18.

Water passing through the coil 20 in the heat exchanger 18 is pumped through a closed circuit by a pump 22, and the pump 22 receives water from a water cooling tower 24, which has a cooling water supply 24-1 and a cooling water return 24-2, either from an inlet 24a to the cooling water supply 24-1 of the water tower 24 (the broken line flow path), where the water temperature will be approximately 85° F., or from an outlet 24b from the cooling water return 24-2 (the solid line flow path) where the water will be approximately 100° F., or partly from each. In that regard, a temperature controlled 3-way diverter or mixing valve 26 is provided to mix water from the inlet 24a with water from the outlet 24b to introduce water at a controlled temperature from the pump 22 to the heat exchanger 18, and a pressure regulator 28 is provided in the line from the inlet 24a to equalize the pressure therein with pressure in the lines from the outlet 24b. Water from the heat exchanger 18 is then returned to the water cooling tower 24 through a return line 48 to be mixed with water entering the water cooling tower 24, and various temperature indicators TI and pressure indicators PI are placed in the water circuit that passes water through the heat exchanger 18 to ensure proper temperature and pressure conditions exist therein. The water circulating through the heat exchanger 18 has ball valves 30, 32 at the water inlet thereto and the water outlet therefrom, respectively, a ball valve 34 in a drain line from the heat exchanger 18 and a ball valve 36 in a vent line from the heat exchanger 18. The water circulating through the heat exchanger 18 also has a check valve 38 at a location upstream of the heat exchanger 18 to prevent reverse flow from the heat exchanger 18, and a strainer 40 immediately upstream of the heat exchanger 18 to prevent any particles in the water flowing through the system from clogging the coil 20. Ball valves 42, 44, 46 are also provided at the outlet from the cooling water supply 24-2 of the water cooling tower 24, the inlet to the cooling water return 24-2 of the cooling water tower 24 and at the outlet from the cooling water return 24-1 of the cooling water tower 24, respectively.

Figure 2:
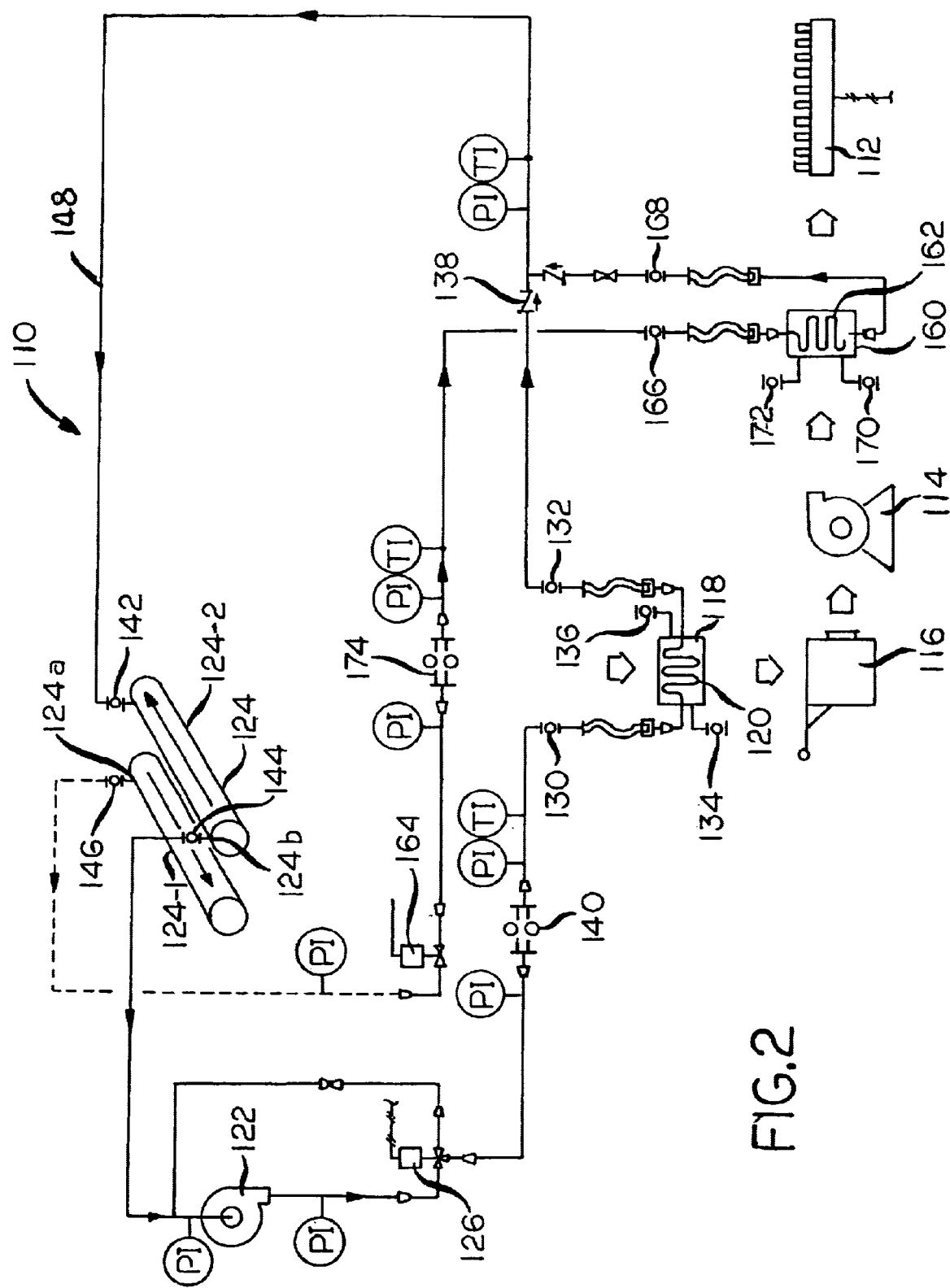
FIG. 2 is a view like FIG. 1 of an alternate embodiment of a glass molding machine cooling air temperature control system according to the present invention.

In the embodiment of FIG. 2, elements corresponding to elements of the embodiment FIG. 1 are identified by one-hundred series reference numbers in which the last two digits are the two digits of the embodiment FIG. 1.

A glass machine mold cooling air temperature control system according to the embodiment of FIG. 2 is identified generally by reference numeral 110 therein. In the temperature control system 110, cooling air is delivered to a cooling air manifold 112 of a glass molding machine from a blower 114, which receives properly heated cooling air from an air plenum 116. The air plenum 116 receives treated cooling air from an indirect heat exchanger 118, and untreated or not properly treated air flows into the heat exchanger 118 from outside the glass manufacturing plant or from a location within the plant. The air passing through the heat exchanger 118 is heated by water flowing through the heat exchanger 118, the water being isolated from air passing through the heat exchanger 118 by passing the water through a sinuous coil 120 that is housed within the heat exchanger 118.

The water passing through the coil 120 in the heat exchanger 118 is pumped through a closed circuit by a pump 122, and the pump 122 receives water from a water cooling tower 124, which has a cooling water supply 124-1 and a cooling water return 124-2. The water flow to the pump 122 is from an outlet 124b of the cooling water return 124-2 of the cooling tower 124, and this water will be at a temperature of approximately 100° F. The water from the pump 122 flows through a temperature controlled 3-way diverter valve 126, from which it either passes to the coil 120 of the heat exchanger 118, or is returned to the low pressure side of the pump 122, or partly flows to the coil 120 and partly to the low pressure side of the pump 122, depending on the requirements of the heat exchanger 118 to properly heat the supply of cooling air that passes thereinto.

When it is desired to cool the cooling air flowing to the manifold 112, a second indirect heat exchanger 160 is provided at a location downstream of the blower 114. The heat exchanger 160 has a sinuous coil 162 therein, and water at an approximate temperature of 85° F. is permitted to flow through the coil 162 to cool air from the blower 114 before it passes to the manifold 112. In that regard, the air from the blower 114 will be somewhat hotter than air from the air plenum 116 that enters the blower 114 due to the heat imparted to the air by its compression in the blower 114 and frictional loses in the blower 114. In any case, when the desired temperature of the cooling air in the manifold 112 is 100° F., this can readily be achieved by cooling the air in the second heat exchanger 160 with a cooling water supply of 85° F. Such cooling water supply to the second heat exchanger 160 is obtained from an outlet 124a of the cooling water supply 124-1 of the water cooling tower 124, and the flow rate of water to the second heat exchanger 160 is controlled by a temperature control flow control valve 164. In the system of FIG. 2 then, heating of a cooling air supply to maintain it at an acceptable temperature for use, when required, is done by the indirect heat exchanger 118, and cooling of such air supply, to maintain it at an acceptable temperature for use, when required, is done by the second heat exchanger 160. When the operation of the flow control valves 126, 164 is properly coordinated, for example, by a common temperature control algorithm, the temperature of the cooling air in the manifold 112 can be plus/minus 1° F. of the desired set point temperature, typically 100° F., during typical day to night inlet air temperature variations that occur in Northern locations during winter months. In any case, even with manual control of the flow control valves 126, 164, the temperature of the cooling air in the manifold 112 can be held within much narrower limits than has heretofore been achieved with known cooling air temperature control systems.

The water circuit through the heat exchanger 118 has ball valves 130, 132 at the water inlet thereto and the water outlet therefrom, respectively, a ball valve 134 in a drain line from the heat exchanger 118 and a ball valve 136 in a vent line from the heat exchanger 118. The water circuit through the heat exchanger 118 also has a strainer 140 at a location upstream of the heat exchanger 118 to prevent any particles in the water flowing through the system from clogging the coil 120. Ball valves 142, 144, 146 are also provided at the outlet from the cooling water return 124-2 of the water cooling tower 124, at the inlet to the cooling water return 124-2 of the water cooling tower 124, and the inlet 146 from the cooling water supply 124-1 of the water cooling tower 124, respectively. A temperature indicator TI and various pressure indicators PI are also provided in the water line that leads to the coil 120 of the heat exchanger 118. The water circuit through the heat exchanger 118 also has a check valve 138 at a location downstream from the heat exchanger 118 to prevent reverse flow through the heat exchanger 118, and a return line 148 to return spent water to the cooling tower 124.

The water circuit through the coil 162 of the heat exchanger 160 has ball values 166, 168 at the water inlet thereto and the water outlet therefrom, respectively a ball valve 170 in a drain line from the heat exchanger 160 and a ball valve 172 in a vent line from the heat exchanger. Such water circuit also has a strainer 174 therein and a check valve 176 to ensure unidirectional flow therethrough.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

I claim:

1. Apparatus for delivering treated cooling air for cooling molds of a glass manufacturing machine, said apparatus comprising:
   a manifold for distributing treated cooling air to molds of a glass manufacturing machine;
   a blower for delivering treated cooling air to said manifold;
   an indirect heat exchanger for receiving untreated cooling air and for delivering treated cooling air to said blower, said indirect heat exchanger having a coil therein, said coil having an inlet and an outlet;
   a water cooling tower for cooling water used in a plant for manufacturing glass articles, said water cooling tower having a first water outlet for delivering water at a first temperature and a second outlet for delivering water at a second temperature, the second temperature being higher than the first temperature;
   a pump for receiving water from at least one of the first outlet and the second outlet of said water cooling tower and for delivering water to said inlet of said indirect heat exchanger to flow through said coil of said indirect heat exchanger from said inlet to said outlet in indirect heat transfer relationship with untreated air flowing into said indirect heat exchanger;
   a temperature controlled three-way mixing valve upstream of said coil of said indirect heat exchanger for receiving water from the first water outlet and the second water outlet and for controlling the treating effect of water delivered to said inlet of said indirect heat exchanger; and
   a return line for returning water from said outlet of said indirect heat exchanger to said water cooling tower.

2. Apparatus according to claim 1 wherein:
said pump is positioned downstream of said mixing valve, said mixing valve serving to control the treating of air in said indirect heat exchanger by controlling the temperature of water flowing to said indirect heat exchanger by controlling relative flow rates of water flowing from said first outlet and water flowing from said second outlet to said coil of said indirect heat exchanger.

3. Apparatus according to claim 1 and further comprising:
a second indirect heat exchanger, said second indirect heat exchanger being positioned between said blower and said manifold for treating air received from said blower before air from said blower is received by said manifold.

4. Apparatus according to claim 3 and further comprising:
   a water flow line from one of said first outlet and said second outlet of said water cooling tower to said inlet of said coil of said second indirect heat exchanger; and
   a temperature controlled flow control valve in said line from said water cooling tower to said second indirect heat exchanger for controlling the rate of the flow of water from said water cooling tower to said second heat exchanger.

5. Apparatus according to claim 4 wherein: said pump is positioned upstream of said mixing valve, said mixing valve serving to control the treating of air in said indirect heat exchanger by controlling the volume of water flowing to said indirect heat exchanger, said mixing valve serving to receive water from one of said first outlet and said second outlet and for selectively delivering water from said pump to said coil of said indirect heat exchanger or for returning water from said pump to an inlet of said pump.

6. The method of treating air for use in cooling molds of a glass manufacturing machine, the method comprising:
   treating a stream of air by passing it through an indirect heat exchanger in indirect heat transfer relationship with a coil in the indirect heat exchanger;
   passing treated air from the indirect heat exchanger through a blower;
   delivering treated air from the blower to a manifold for delivering to molds of a glass manufacturing machine;
   cooling water from a glass manufacturing plant in a water cooling tower;
   removing water at a first temperature from a first outlet of the water cooling tower;
   removing water at a second temperature from a second outlet of the water cooling tower; and
   pumping water comprising water selected from the group consisting of water from the first outlet of the water cooling tower, water from the second outlet of the water cooling tower and a mixture of water from the first outlet of the water cooling tower and the second outlet of the water cooling tower to flow through the coil of the indirect heat exchanger to alter the temperature of air flowing through indirect heat exchanger.

7. The method according to claim 6 wherein:
the step of pumping water consists of mixing water from the first outlet of the water cooling tower and the second outlet of the water cooling tower for delivery at a controlled temperature to the coil of the indirect heat exchanger.

8. The method according to claim 6 and further comprising:
   delivering air from the blower to a second indirect heat exchanger in indirect heat exchange relationship with a coil before delivering air from the blower to the manifold; and
   passing water from the water cooling tower to the coil of the second indirect heat exchanger to indirect heat exchange relationship with air flowing through the second indirect heat exchanger.

9. The method according to claim 8 wherein: the step of pumping water comprises pumping a stream of water from only one of said first outlet and said second outlet of said water cooling tower at a variable rate to the coil of the indirect heat exchanger, the stream of water being pumped at a fixed rate to a mixing valve and returned at a variable rate from the mixing valve to an inlet of a pump used in pumping water.

* * * * *